(12) United States Patent
Booij et al.

(10) Patent No.: US 8,792,305 B2
(45) Date of Patent: Jul. 29, 2014

(54) ULTRASOUND DETECTORS

(75) Inventors: Wilfred Edwin Booij, Nordby (NO); Knut Osvald Welle, Oslo (NO)

(73) Assignee: Sonitor Technologies AS, Oslo (NO)

( * ) Notice: Subject to any disclaimer, the term of this patent is extended or adjusted under 35 U.S.C. 154(b) by 1162 days.

(21) Appl. No.: 12/674,297

(22) PCT Filed: Aug. 20, 2008

(86) PCT No.: PCT/GB2008/002824
§ 371 (c)(1),
(2), (4) Date: Apr. 11, 2011

(87) PCT Pub. No.: WO2009/024784
PCT Pub. Date: Feb. 26, 2009

(65) Prior Publication Data
US 2011/0235466 A1      Sep. 29, 2011

(30) Foreign Application Priority Data

Aug. 20, 2007 (GB) .................................. 0716259.7
Nov. 19, 2007 (GB) .................................. 0722671.5

(51) Int. Cl.
*H04B 11/00* (2006.01)
(52) U.S. Cl.
USPC ........................................................ 367/135
(58) Field of Classification Search
USPC ........................................................ 367/135
See application file for complete search history.

(56) References Cited

U.S. PATENT DOCUMENTS

| 5,661,699 A |  | 8/1997 | Sutton |
| 5,832,038 A |  | 11/1998 | Carsello |
| 5,852,638 A |  | 12/1998 | Chen et al. |
| 6,133,849 A | * | 10/2000 | McConnell et al. ........ 340/12.54 |
| 7,383,297 B1 | * | 6/2008 | Atsmon et al. ................ 709/200 |
| 2006/0193270 A1 |  | 8/2006 | Gehasie et al. |
| 2010/0030838 A1 | * | 2/2010 | Atsmon et al. ................ 709/200 |
| 2011/0235466 A1 | * | 9/2011 | Booij et al. ................... 367/135 |
| 2012/0044786 A1 | * | 2/2012 | Booij et al. ................... 367/127 |

FOREIGN PATENT DOCUMENTS

| FR |  | 2801457 |  | 5/2001 |
| JP |  | 2004219377 |  | 8/2004 |
| WO |  | 9731437 |  | 8/1997 |
| WO |  | 0021203 |  | 4/2000 |
| WO | WO 2004080111 | A2 | * | 9/2004 |

OTHER PUBLICATIONS

Microphone Guide; http://web.archive.org/web/20081121180318/http://www.sygyt.com/en/microphone-guide; Nov. 2008.*
Shure SM58; http://en.wikipedia.org/wiki/Shure_SM58; printed Oct. 1, 2013.*

* cited by examiner

*Primary Examiner* — Daniel Pihulic

(57) ABSTRACT

A method of receiving data coded on an ultrasonic signal comprising: detecting said ultrasonic signal using a microphone (4) having its greatest response below 20 kilohertz or a microphone (4) adapted for human speech reception; and decoding said signal to determine said data.

16 Claims, 6 Drawing Sheets

ULTRASOUND DETECTORS

This application is entitled to the benefit of, and incorporates by reference essential subject matter disclosed in PCT Application No. PCT/GB2008/002824 filed on Aug. 20, 2008, which claims priority to Great Britain Patent Application No. 0716259.7 filed Aug. 20, 2007 and Great Britain Patent Application No. 0722671.5 filed Nov. 19, 2007.

BACKGROUND OF THE INVENTION

1. Technical Field

This invention relates to detecting ultrasound signals e.g. for identification or positioning of mobile ultrasonic transmitters.

2. Background Information

There have been many previous proposals for systems which employ ultrasound communication for tracking mobile ultrasonic transmitters (tags), e.g. for monitoring the movements of hospital equipment or cargo containers. Ultrasound indoor positioning systems usually have at least one dedicated ultrasound receiver in every room in a building to give reliable positioning information.

SUMMARY OF THE INVENTION

The present invention aims to provide some improvement and to open up the possible applications of ultrasound communication. When viewed from a first aspect the invention provides a method of receiving data coded on an ultrasonic signal comprising: detecting said ultrasonic signal using a microphone having its greatest response below 20 kilohertz; and decoding said signal to determine said data. Alternatively the invention provides a method of receiving data coded on an ultrasonic signal comprising: detecting said ultrasonic signal using a microphone adapted for human speech reception; and decoding said signal to determine said data.

From a second aspect the invention provides apparatus for receiving an ultrasonic signal comprising a microphone having its greatest response below 20 kilohertz and means for decoding said ultrasonic signal received by said microphone. Alternatively the invention provides apparatus for receiving an ultrasonic signal comprising a microphone adapted for human speech reception and means for decoding said ultrasonic signal received by said microphone.

When viewed from a third aspect the invention provides a method of receiving data coded on an ultrasonic signal comprising: detecting said ultrasonic signal using acoustic detecting means having a first sensitivity to frequencies below 20 kilohertz and a second sensitivity to frequencies between 20 kilohertz and 60 kilohertz, wherein said first sensitivity is greater than said second sensitivity; and decoding said signal to determine said data.

From a fourth aspect the invention provides apparatus for receiving data encoded on an ultrasonic signal comprising: acoustic detecting means for detecting said ultrasonic signal, having a first sensitivity to frequencies below 20 kilohertz and a second sensitivity to frequencies between 20 kilohertz and 60 kilohertz, wherein said first sensitivity is greater than said second sensitivity; and means for decoding said signal to determine said data.

Thus it will be seen by those skilled in the art that in accordance with the invention rather than using a specialized ultrasonic transducer, an ordinary acoustic microphone designed for use in the audible range (below 20 kHz) is used, particularly one adapted for human speech. Associated hardware and software optimized for detecting and processing audible sounds may also be used. This stems from the Applicant's realization that many ordinary microphones that are designed e.g. for human speech can be successfully used for reception of ultrasound signals of the type used in ultrasound-encoded data communication systems; and further that modern detection hardware and software, such as the digital sampling offered on PC sounds cards, can also be used to handle ultrasonic signals.

Ordinary speech microphones typically have a relatively flat response up to about 10 kilohertz (kHz) which then gradually falls off so that there is a significantly attenuated response at 20 kHz (generally considered to be the limit of human hearing). However the Applicant has found that there is still a sufficient response into the ultrasonic, i.e. above 20 kHz and more typically around 35-45 kHz, to be able to receive and decode information encoded in ultrasound signals. Although the response of such microphones well away from their design range may be much lower than it would be for, say, speech frequencies, the Applicant recognizes that this is much less important since at ultrasound frequencies there tends to be very little in the way of noise so that even a weak response can give a clearly distinguishable signal.

The sensitivity of an audio detection system (whether this is constrained by the microphone or associated hardware and software) will typically exhibit variation within the frequency ranges specified in accordance with the third and fourth aspects of the invention. The first and second sensitivities will therefore in general be parameters characterizing the frequency response within the respective frequency ranges. The first sensitivity could therefore be the maximum sensitivity within the range 0-20 kHz, the mean or median sensitivity or indeed any other measure of the response.

Preferably the first sensitivity is at least twice, more preferably at least four times the second sensitivity.

By using the 'residual' response of ordinary audible-range microphones, in accordance with the invention ultrasound communication systems can be constructed at a lower cost by virtue of the wide availability and low price of such microphones. However the Applicant has appreciated a particular benefit that the invention can give which stems from the fact that a very large number of desktop and laptop PCs include a supplied microphone, either inbuilt or as an accessory, which can be used in accordance with the invention to provide part of an ultrasound communication system. The same is also true of portable voice-enabled devices such as cell phones and smart phones. The Applicant has further recognized that the opportunity to utilize microphones/detecting arrangements that are not optimized for ultrasound is enhanced by the recent widespread availability of PCs, laptops and other mobile devices with, on one hand, high quality analogue to digital converters which combine high bit resolution with high sample rates; and on the other hand with sophisticated digital signal processing resources.

Thus in at least some embodiments of the invention, simply through the use of appropriate software, existing devices can be used to implement ultrasound communication systems without the need for any additional hardware. This clearly significantly opens up the range of possible applications.

When viewed from a further aspect the invention provides computer software for operating a digital computing means, the software being adapted to receive a digitally-sampled data stream, identify signals at frequencies greater than 20 kHz and decode said signals to determine data encoded thereon.

Preferred features of the methods and apparatus set out herein are also preferred features of the aforementioned software or computing means executing the software.

Although, as set out above, one of the possible benefits of the invention is the ability to utilize the in-built capabilities of a wide range of devices for ultrasound reception, the Applicant recognizes that not all current devices have the required capabilities. For example there are many computing devices which adhere to the Intel AC97 audio codec standard which has CD quality sampling: 16 bits at 44.1 kilohertz. Although this allows sampling in a narrow band at the lower edge of ultrasound, it is not compatible with at least preferred embodiments of the invention in which an ultrasound frequency in the range 35-45 kHz is used. However the Applicant has devised a further arrangement which allows preferred embodiments of the invention to be implemented using such devices. Thus in at least some embodiments the apparatus of the invention comprises means for down-converting the frequency of a signal received by a microphone, thereby permitting sampling at a lower frequency.

The frequency down-converting means could comprise any appropriate analogue domain arrangement for shifting the ultrasound frequency into the audible range. Preferably it comprises means for modulating the received signal at a predetermined frequency. As will be appreciated by those skilled in the art this will give a lower effective frequency as the difference between the received frequency and the predetermined frequency. In one set of embodiments envisaged by the applicant this could be by means of an oscillatory control of an amplifier amplifying signals received by the microphone. For example such oscillatory control could be applied to the gain of an amplifier or to the supply voltage to a microphone. In practical terms such an arrangement has the advantage that one or both could be employed in a computing device such as a personal computer by using software control of the relevant gain or external microphone output voltage. Accordingly an existing computing device could be used for ultrasound signal detection even though it does not have the capability to sample ultrasound signals.

In another set of embodiments the apparatus comprises means for mixing a predetermined signal with the received ultrasound signal. This has the same effect of giving a reduced frequency signal equivalent to the difference in frequency of the two mixed frequencies. In some preferred embodiments the mixing means comprises a field-effect transistor (FET). In some particularly convenient embodiments a FET built into a microphone package is employed. An oscillator providing the signal of predetermined frequency is preferably connected to the bias input of the FET.

The waveform of the oscillatory control or the mixed signal could be of any convenient shape—e.g. sinusoidal, square wave or a more complex shape.

Where it is not suitable or practicable to modulate the gain of a microphone amplifier or the supply voltage as set out above, frequency down-conversion can be achieved in other ways such as by mixing a signal of predetermined frequency from an oscillator as just described. Such an oscillator can be combined into a package with an ultrasound-capable microphone and associated electronics to provide a module which allows any computing device capable of digital handling of ordinary audible sound to be used as an ultrasound signal receiver and processor. Such a module is considered to be novel and inventive in its own right and thus when viewed from a further aspect the invention provides a device comprising a transducer for receiving ultrasound signals, an oscillator adapted to generate a signal of predetermined frequency and means for modulating the signal received by the transducer using the signal of predetermined frequency.

The modulation could be achieved by controlling the gain of an amplifier or controlling the voltage applied to a microphone. Preferably however it is achieved by mixing the signal from the oscillator with the signal from the transducer in the manner described earlier.

Thus in summary in some embodiments an existing device can be modified to operate in accordance with the invention by the addition of suitable hardware. For example a microphone and associated amplifying/filtering electronics meeting the sensitivity requirements in accordance with the invention could be connected to a suitable analogue input of an existing device. Alternatively peripheral apparatus comprising such a microphone arrangement and frequency down-conversion means could be connected to an existing device which did not have the capacity to process ultrasound signals. In a further alternative, peripheral apparatus including a microphone and associated amplifying/filtering electronics meeting the sensitivity requirements in accordance with the invention and digital processing means could be attached to the digital input of a device.

One possible application of the principles of the invention is an improved implementation of an ultrasonic asset tracking system in which mobile tags are affixed to equipment, e.g. in a hospital, and one or more receivers is placed in every room or other location in which it is required to track the equipment. In accordance with the present invention some or all of the receivers in such a system can, for example, be implemented as ordinary PCs. This allows them to perform more than one function. For example it might only be necessary to install dedicated receivers in rooms which do not contain a PC; or terminals for receiving the tracking information can also act as one of the receivers.

However there are many other different possible applications which are associated with PCs and other conventional equipment. In one set of preferred embodiments there is provided a system comprising apparatus in accordance with the invention and one or more portable ultrasonic transmitters adapted to transmit an ultrasonic signal containing information identifying the tag, the apparatus being adapted to detect and identify said transmitter(s) when in detection range of the apparatus.

There are many circumstances where the ability to determine the presence of and identify a tag would be beneficial. For example this could be used by a PC or workstation to recognize a particular user, either to configure functionality or display for that user; or for security purposes to deny access unless a valid identification is made. The latter is clearly more secure than many other types of security as it requires the physical possession of a security permission device (the tag) but without requiring any additional hardware at the computer such as a smart card reader, fingerprint scanner or the like. It also enhances convenience as it could be implemented so as not to require action from a user. Similarly when a user moves away security may again be restored automatically without the user having e.g. to log off. Applications are also envisaged for centers allowing candidates to sit online examination; or in call centers to monitor the presence of workers to give just two examples.

In one set of preferred embodiments an additional level of security is provided. This could be by means of a password, fingerprint or iris scanner, face recognition etc. Preferably however the computer is adapted to identify a user from their voice. Although voice recognition is well known per se the Applicant has recognized that there is a substantial benefit to combining this with ultrasonic identification in accordance with the invention since both can be achieved using a microphone adapted for speech reception. In other words no additional hardware is required in order to implement this additional form of security—both can be provided in a single software package, retaining the benefits of being able to make a no-contact, but secure login.

A further preferred feature that may be employed in any embodiment of the invention is for the portable ultrasonic transmitter to transmit an identification code using a code-hopping protocol. Such protocols are well known per se for radio frequency portable transmitters for example in the context of remotely operated locks such as on cars. The principle is that the portable transmitter and receiver are pre-programmed with the same algorithm which generates pseudo-random codes. The receiver then knows which code to expect, but an eavesdropper cannot predict the next code (and therefore construct an imitating transmitter) without knowing the algorithm. The algorithm could be an iterative one (so that knowledge of the current place in the sequence is required) or could be based on other data common to the transmitter and receiver such as synchronized clocks.

The use of ultrasonic tags in the sort of applications described above is beneficial over alternatives such as those based on radio frequency communication as they can be made to operate over a shorter range and with less 'leakage' (i.e. they are more directional) without requiring a strict line of sight as for e.g. infra-red. There is also less need to avoid interference with other equipment sensitive to RF transmissions which can be of particular importance in a hospital in the vicinity of sensitive medical equipment.

Of course the computer which is making the detection of a tag could be arranged to control an external device—e.g. to switch on a light when a person enters the room and off when they leave it; or to unlock/open a door etc.

When using existing non-specialized equipment it is typically necessary that no deliberate filtering of high frequency signals is applied, although this is not always strictly essential as some filtering may be tolerable.

Although, given the distinct frequency bands, it is possible for a single microphone and associated reception and processing means to receive and process both audible sound, e.g. speech, and, in accordance with the invention, ultrasonic signals, preferably a dedicated sound channel is used for receiving ultrasound. This has the advantage that user control of that channel can be disabled to allow continuous operation of an ultrasound communication system with guaranteed performance characteristics. In embodiments which employ speech recognition as an additional level of security this could be implemented using either or any microphone but it is preferred to use the same channel as for ultrasound detection, for the same reason that access and performance can be guaranteed by disabling user control of this channel.

In preferred embodiments of the invention the microphone is connected to or integral with a computing device comprising processing means having dynamic bandwidth assignment. It is also preferred that the processing means has support for multiple streams, preferably in and out. Most preferably the processing means is arranged to operate according to the High Definition Audio standard defined by Intel®.

In accordance with the invention the maximum response of the microphone is preferably below 30 kHz, more preferably below 35 kHz.

Preferably in accordance with the invention only a single microphone or pair of microphones is used.

The ultrasound signal that is decoded in accordance with the invention may be encoded in any suitable way. In the simplest embodiments this could simply be a determination of the frequency. Other possibilities include frequency or phase shift keying or indeed any other known encoding regime.

In one set of preferred embodiments the encoded ultrasound signal takes the form of a sequential pattern of tones at different frequencies. This could be according to a frequency shift key encoding scheme or some other encoding scheme. In order to decode such a signal it is therefore necessary to determine the pattern of frequency changes. Presently preferred methods comprise comparing the received signal to one or more predetermined templates.

In preferred embodiments the ultrasound signal includes a message comprising a plurality of distinct packets and the comparison procedure comprises a first stage in which a received message is compared on a packet basis to a packet template and a second stage in which individual bits within the packet are determined. The first stage allows a packet to be identified. The second stage then allows accurate determination of the bits in that packet. This is advantageous since it has been found to give accurate, reliable results and in particular to be highly tolerant of Doppler shift affecting the ultrasound pulses. Since this method may be employed such that it largely relies on matrix calculations, it is particularly suited to modern microprocessors.

Such a method is considered to be novel and inventive in its own right, regardless of the equipment used to receive the ultrasound signal. Thus when viewed from a further aspect, the invention provides a method of decoding a received ultrasound signal including a message comprising a plurality of distinct packets, the method comprising: in a first stage comparing at least a portion of the received message to a packet template; and in a second stage determining individual bits within the packet.

Typically a message will comprise a plurality of packets and thus preferred methods in accordance with this aspect of the invention comprise the step of reconstructing the message from the constituent packets. This could be done before or after the second stage.

Preferably the incoming signal is subjected to a Fourier transform step to enable the analysis of the frequency components thereof. A fast Fourier Transform (FFT) may be used. Preferably a short-time Fourier transform (STFT) is used. Preferably a moving Fourier transform window is used.

The first stage preferably comprises performing a cross-correlation, most preferably a two-dimensional cross-correlation between the frequency (e.g. Fourier) transformed signal and a predetermined packet template. This allows a data packet to be identified from the data stream. One or more packet templates could be employed. The use of packet templates which do not resolve between individual bit values is envisaged. For example a single template could be used which was effectively the envelope of frequencies for each bit position in the expected packet structure. If there were more packet structures in use, there could then be corresponding templates. At the other extreme there could be a template for each possible word represented by the packet. In this example the data would be decoded in the first stage, with the second stage simply acting as verification.

In one set of preferred embodiments however two packet templates are employed, with windows corresponding respectively to the true state of all the bits in one template; and the false state of all bits in the other template. Packet correlation is then calculated by combining, e.g. by summing, the correlation scores achieved by calculating the correlation between the incoming signal and each of the templates.

Preferably the measured signal and template are repeatedly shifted relative to one another in both frequency and time in order to try to establish the best correlation. The shifts in frequency allow compensation e.g. for Doppler shift at a packet level.

In some preferred embodiments the first stage comprises amplitude re-scaling by correlation in which the incoming signal is normalized over a predetermined time window to provide an amplitude normalization constant, the normalized signal being used in subsequent Fourier transform and cross-correlation calculations and the final results from the cross-correlation being corrected by multiplying them by the normalization constant. This has the advantage of avoiding having to process the Fourier transforms and cross-correlations using floating numbers which would require significantly greater computing resources in some applications—e.g. embedded systems.

The first stage preferably also comprises performing a bitwise noise correlation by defining at each time step a noise level corresponding to the correlation value of the 'losing' bit value correlation.

In some preferred embodiments, for example those based on personal computers, matrix multiplication is used to calculate the cross-correlations. In other embodiments it is performed by indexing of the signal matrix. This is more efficient in terms of processing resources where the detector is implemented in a non-vectorized environment, such as in embedded systems, since the Applicant has recognized that most templates are very sparse arrays (they contain very few non-zero elements)

Preferably further correlation is carried out at message level by cross-correlating the correlation peaks obtained for each packet making up a message. This cross-correlation preferably comprises shifting the correlation peak for each packet to a common time point by applying a predetermined temporal offset depending on the position of the packet in the message. Preferably the time-shifted peaks are combined to give a single trace, e.g. by adding or multiplying them together, which could be part of establishing an arithmetic or geometric mean thereof. The applicants have appreciated that this is advantageous in that it provides a highly accurate estimate of the arrival time of the message since timing errors on individual bits are effectively averaged out across all the bits of a message. This accurate timing information is useful not only for decoding the message but also for determining the distance between the transmitter and the microphone—i.e. time-of-flight location—when transmission from the mobile tag can be synchronized.

The individual bits could have any number of possible levels between which it necessary to resolve each bit in the second step. Preferably however they are binary bits—i.e. each bit has only two possible levels. The packet will typically have a small number of bits, e.g. fewer than 16, preferably fewer than 8, preferably 4 bits.

BRIEF DESCRIPTION OF THE DRAWINGS

Certain preferred embodiments of the invention will now be described, by way of example only, with reference to the accompanying drawings in which.

DETAILED DESCRIPTION OF THE INVENTION

Figure 1:
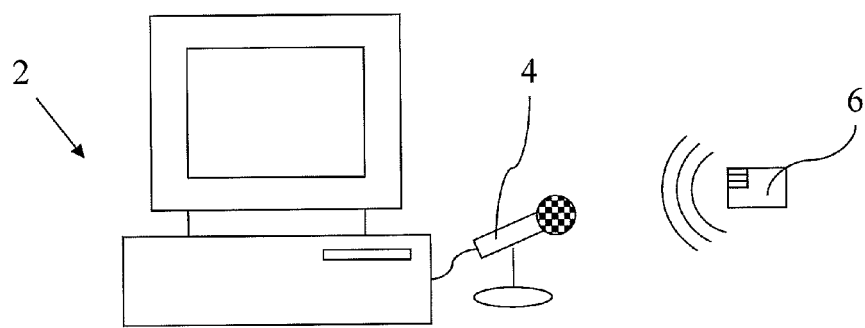
FIG. 1 is a schematic representation of an ultrasound communication system in accordance with the invention.
Figure 2:
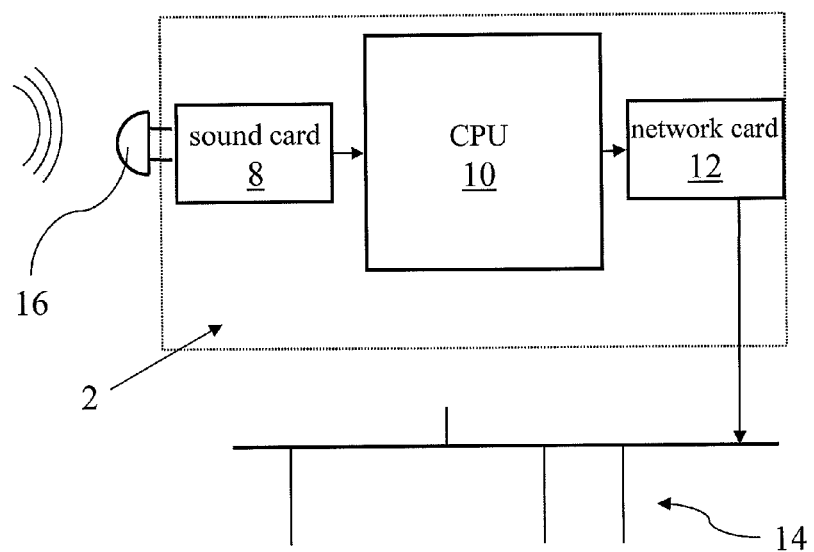
FIG. 2 is a schematic diagram of a computer device used to implement the invention with an external microphone added

Referring initially to FIGS. 1 and 2, an embodiment of the invention comprises a personal computer (PC) 2 running a Windows® operating system which conforms to the Intel® High Definition Audio (HDA) standard. The PC 2 in this embodiment is shown as being equipped with a single external microphone 4. In another embodiment (corresponding to the schematic representation in FIG. 3), two fixed microphones 16 in a front-facing position (e.g. on the user display) with a separation of approximately 20 cm are provided.

The microphone(s) 4,16 is/are designed to be sensitive to human speech and thus have their greatest response below 20 kHz but they nonetheless retain sensitivity into the range of 35-45 kHz with no filtering of these frequencies being applied anywhere in the analogue signal chain before digitization takes place. Two examples of suitable commercially available microphones are the Panasonic WM-61A and the Sonion SiMic TC200Z11A available from Sonion Roskilde AS, of Roskilde, Denmark.

The Intel® HDA standard is designed to improve the audio experience on PC's with a primary focus on PC's running the Windows® operating system. There are three features of the HDA standard which are particularly beneficial (although not essential) when implementing the present invention. The first is that the standard allows for a maximum serial data output rate (SDO) of 48 megabits per second (MBs) and a maximum serial data input (SDI) rate of 24 MBs. The second is that bandwidth is not fixed but can be assigned dynamically according to need. Thirdly there is support for multiple input and output streams.

The SDI bandwidth allows for an input sampling rate of 192 kHz at 32 bit resolution on two channels or a sampling rate of 96 kHz at 32 bit resolution on up to eight channels. In the preferred embodiment of the present invention however a 24 bit resolution at a sampling rate of 96 kHz is sufficient to be able to digitize and subsequently decode ultrasound signals in the range 35-45 kHz which is therefore clearly within the capabilities available, whether one or two channels are used.

The microphones 4, 16 employed can be used simultaneously for ordinary sound tasks, such as voice and telephony, as well as for receiving ultrasound due to the multiple stream and dynamic bandwidth capabilities of the HDA standard described above. However, to maximize performance and reliability of the ultrasound detection system implemented using the PC 2, in the preferred embodiments the PC 2 is configured so that a user cannot disable the ultrasound detection function by interfering with the volume or mute control of the microphone channels (s) being used by the ultrasound detection system. This can be achieved in software by disabling user access to say the right microphone channel volume control associated with ultrasound reception. This channel can also be used for voice recognition.

Thus in a preferred embodiment the PC 2 has two microphone channels (left and right) each capable of both audible sound and ultrasound reception at 96 kHz sampling rate with a 24 bit resolution (i.e. 96,000 samples every second each sample being 24 bits). The microphone channels have a signal to noise ratio of 60 decibels sound pressure level over the whole frequency range 20 Hz-45 kHz.

The PC 2 also comprises an external jack socket (not shown but on a rear-mounted panel) for connection of the external microphone 4 that replaces the right microphone channel when the external microphone 4 is plugged in (i.e. the presence of a jack plug in the socket can be sensed in order to effect the switching.)

In this scenario the left microphone channel is available for voice applications where the sound volume needs to be adjusted by the user and/or third party software.

When not completely muted the left audio channel can be used in addition to the right ultrasound (fixed sound volume) microphone channel by the ultrasound detection system to reduce the effect of multi-path interference. Similarly both microphones can be used in audio/voice applications for noise cancellation (directivity) purposes.

The external jack makes it possible to locate the ultrasound reception microphone 4 a short distance away from the PC (e.g. 2-3 meters).

Figure 7:
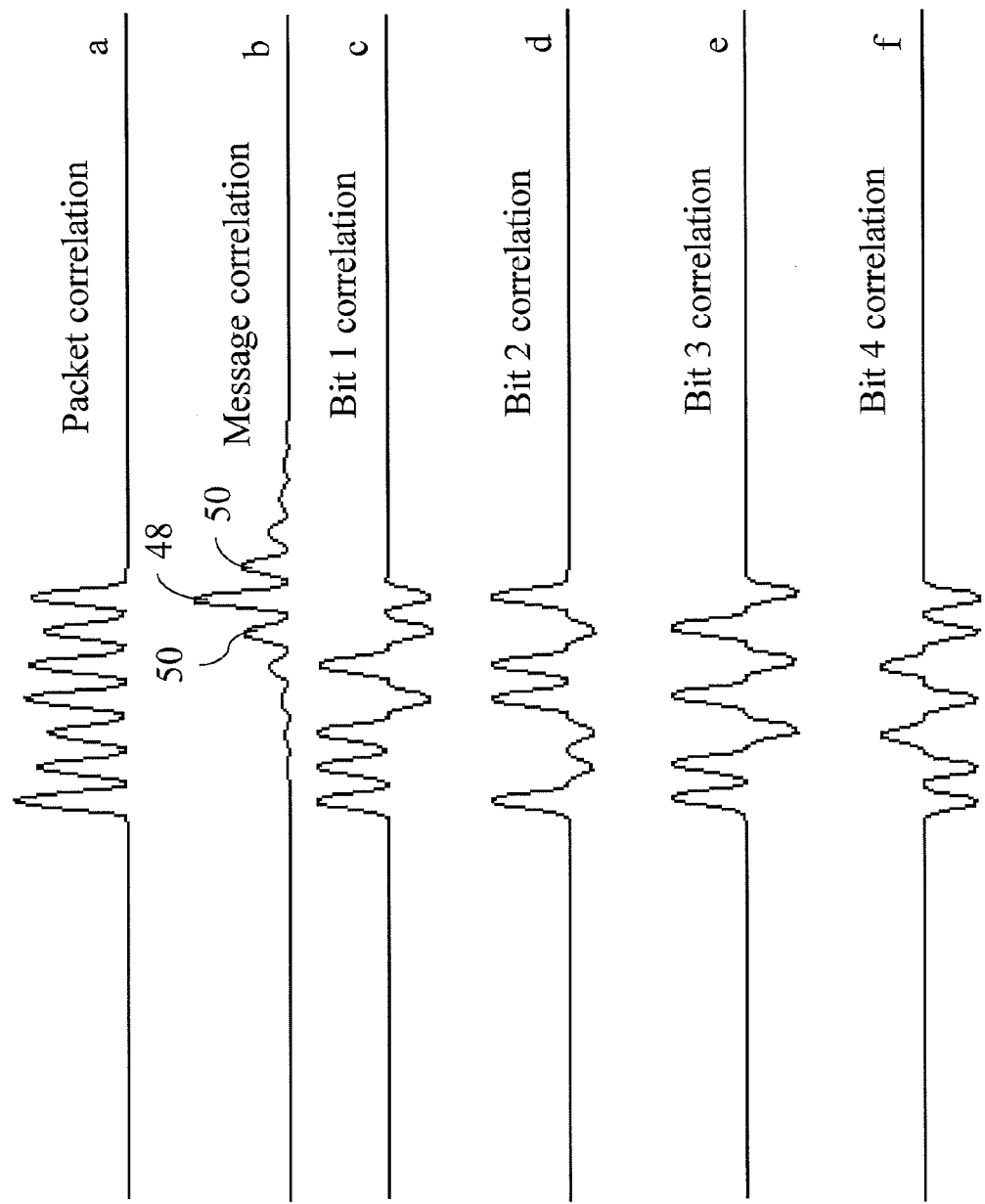
FIGS. 7a-7f show various correlation plots.

In accordance with the embodiments of the invention described herein an ultrasonic transmitter tag 6 is provided which transmits digital data to the PC 2 using frequency shift keying. More specifically it transmits data messages of seven packets in length, with each packet made up of four bits. Each bit is represented by a single tone transmission on one of a pair of frequencies depending on whether a true or false bit is being transmitted. The true and false bit frequencies can be considered as equal offsets above and below a median frequency. These median frequencies vary with each of the four bit positions in the packet in a predefined pattern. Moreover the temporal separation between bits and between packets is predefined. The structure of the messages is explained further below with reference to FIG. 7.

The transmission is received using the microphone 4, 16 which is connected to a sound card 8 which samples the received signal to convert it into digital data. Sound acquisition is achieved using the sound acquisition functions which are built-into Labview (trade mark) available from National Instruments. These functions call Microsoft DirectSound (trade mark) dll functions. DirectSound is a software component of the DirectX library, supplied by Microsoft, that resides on a computer with the Windows operating system. It provides a direct interface between applications and the sound card drivers.

The digitized signal is passed to the CPU 10 where it is decoded so that the original data message it contains can be retrieved. This will be described in greater detail later with reference to FIGS. 5 to 7. The decoded data is then passed to a network card 12, such as an Ethernet card, to be communicated to a data network 14. Of course any other suitable network such as a wireless network could be employed or the PC could instead be a stand-alone machine.

Figure 3:
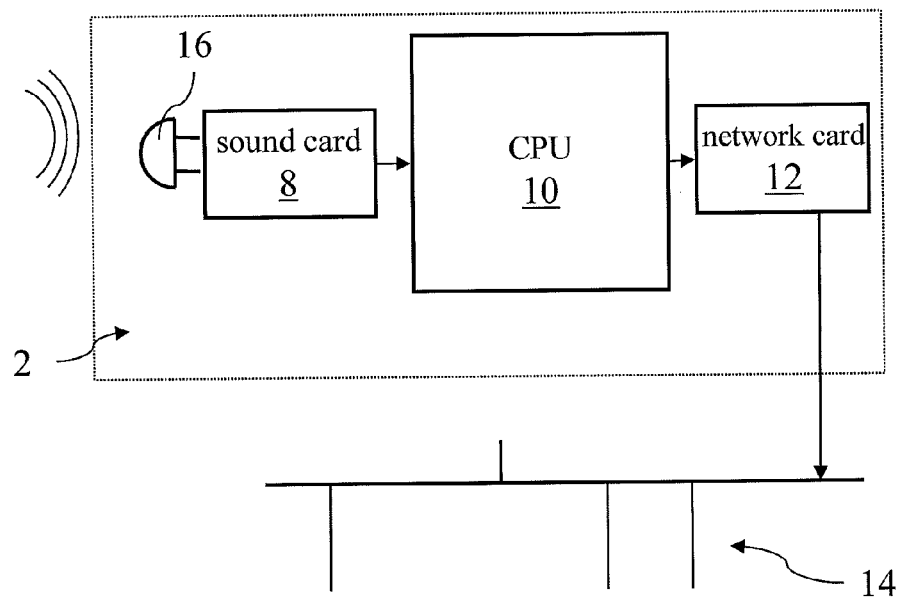
FIG. 3 is a schematic diagram of a computer device used to implement the invention with no additional hardware.

FIG. 3 shows an alternative embodiment. In this embodiment rather than an external microphone 4, the PC 2 has an inbuilt microphone 16. The requirements for and characteristics of this are as in the previous embodiment. In this embodiment therefore no additional hardware is required and the invention can be implemented on a conventional computer with the addition of suitable software. The other elements are common to the earlier description and are therefore given the same reference numerals.

Figure 4:
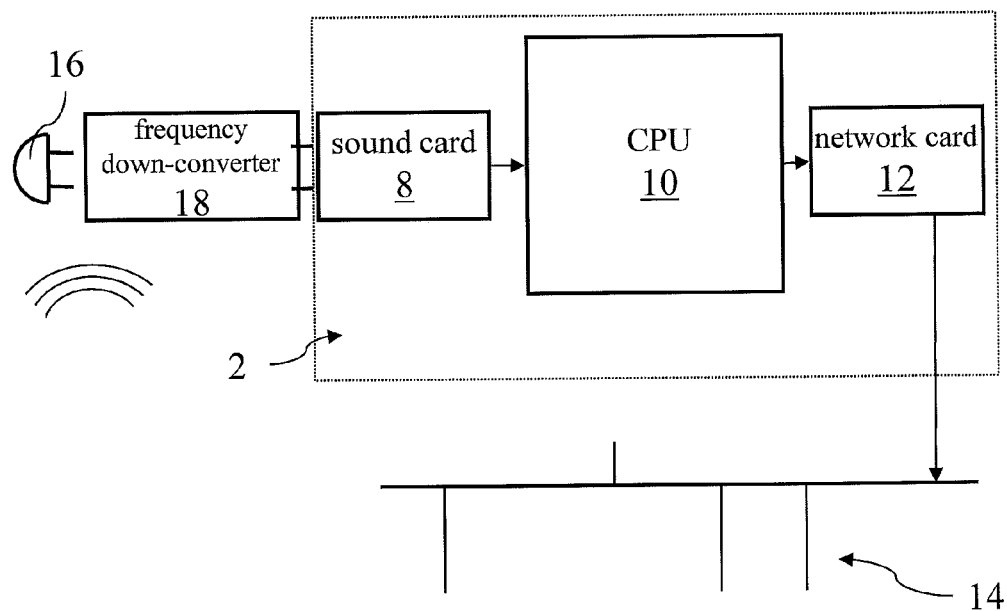
FIG. 4 is a schematic diagram of a computer device used to implement the invention with an external receiver unit added.

FIG. 4 shows another possible embodiment. This has both an external microphone 16 and a frequency down-converter 18 which converts ultrasonic signals in the range 35-45 kHz to the range 0-10 kHz. This is then fed to the line input of a standard PC sound card 8. Typically the microphone 16 and frequency down-converter 18 would be housed in a common package. Embodiments such as this are of particular use where the PC's sound channel is not sufficiently sensitive to ultrasonic frequencies—for example because deliberate filtering is applied.

Figure 5:
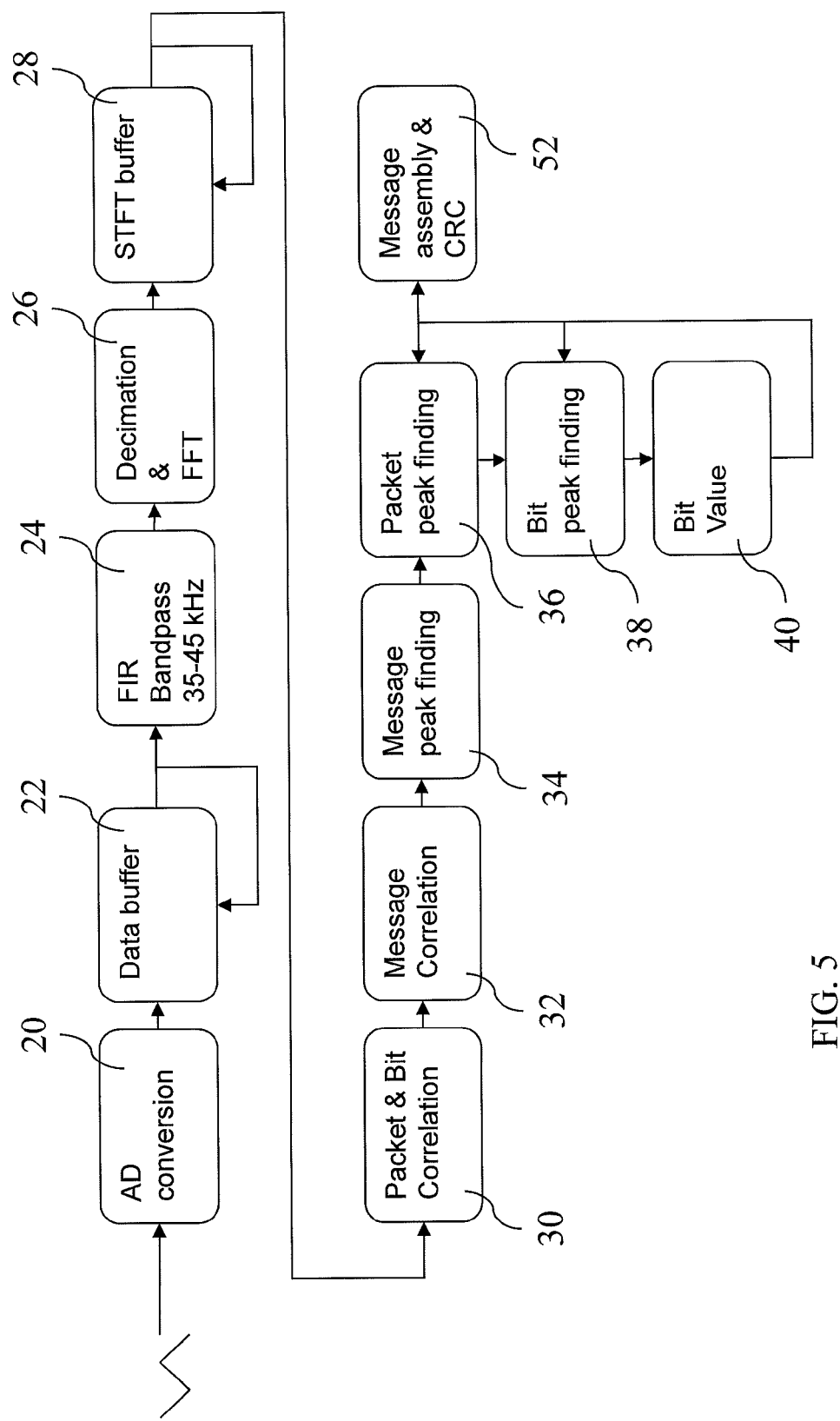
FIG. 5 is a flow diagram illustrating an ultrasound decoding algorithm in accordance with the invention.
Figure 6:
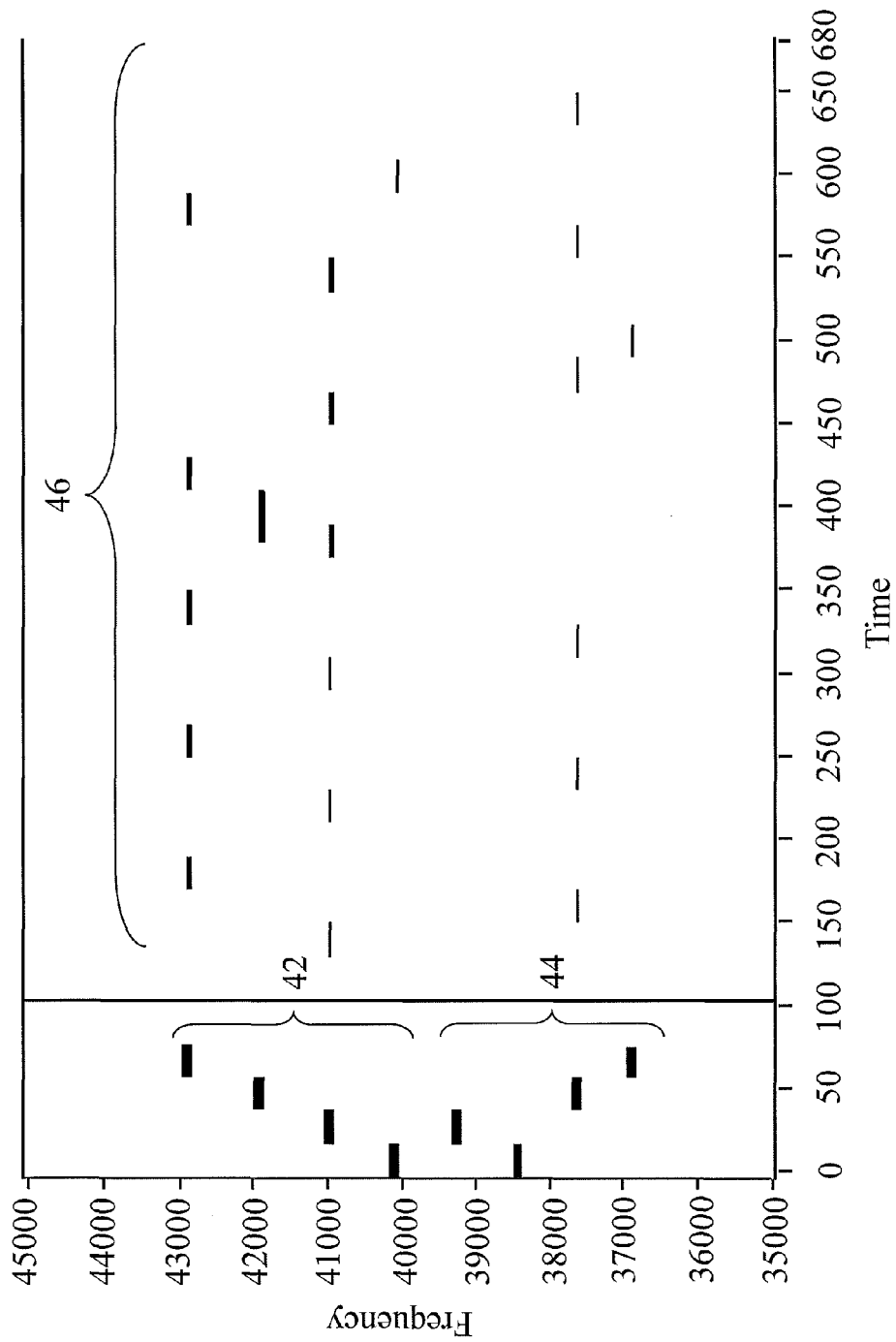
FIG. 6 is a plot of frequency against time to illustrate a 4 bit template and incoming message respectively.

The signal decoding process will now be described with reference to FIG. 5 which is a flow diagram illustrating the main logical stages thereof. In the first stage 20 the analogue signal is sampled to convert it to a digital signal. Typically the sound is sampled at 96,000 samples per second at 24 or 32 bits per sample, although it has been established that 18 bits would be adequate. The samples are stored in a buffer 22 of size sufficient for 48,000 samples (i.e. half a second). This corresponds to a buffer size of 141 kB if 24 bit sampling is used.

The bitstream passing out of the buffer 22 is filtered to contain only the ultrasound band of interest (35-45 kHz) using a finite impulse response (FIR) filter routine 24. In embodiments employing voice recognition this may be filtered from the raw signal and processed separately.

In the next step 26 the filtered signal is then subjected to decimation (in some systems) and processed by the CPU 10 using a fast Fourier transform (FFT) routine in order to permit analysis of the incoming signal in the frequency domain. The size of the data chunks read from the digitization buffer 22 is the product of the length of the samples to process in the FFT routine (typically 20-256 samples) and the number of shift frames to read (typically 10-100), with the constraint that this product should be smaller than the buffer size. The shift frames are samples shifted in time relative to the actual time of receipt, the purpose of which will become clear below.

The tag 6 transmits using a 20 millisecond bit length. On the other hand a 32 millisecond FFT frame length is used which is substantially longer. This is advantageous since it means echoes with an additional path length less than 12 ms multiplied by the speed of sound (i.e. approximately 4 meters) are also taken in the FFT.

Next a short time Fourier transform (STFT) is carried out at step 28. This consists of a sequence of Fourier transforms with a fixed shift in time. The number of points in the time frame used in the fast Fourier transform (FFT), i.e. the FFT length, can be smaller than the number of points used in the FFT calculation (FFT size). This can be used to increase the frequency resolution of the Fourier transform at the cost of additional computational power. Typically the FFT size is set to approximately twice the FFT length but always a power of two. If the incoming signal does not add up to a multiple of the FFT length and shift combination, the remainder of the signal (not transformed) is stored in a local buffer and added to the start of the next incoming data chunk.

The precise filter applied in the filtering step 24 is dependent upon the decimation factor to be applied at the next step 26 (if indeed any decimation is applied in order to avoid aliasing of the ultrasound signal and other audio signals when decimation is done). If, for example, no decimation, or a decimation factor of three, is employed, a real FFT is used. If decimation by a factor of five is used the STFT is realized by performing separate FFT's on the real and imaginary part of the signal datastream after which the results are combined to obtain a real FFT signal again.

Once the appropriate Fourier transforms have been applied the frequency distribution is analyzed to determine the encoded data.

In order to verify that a valid message has been received and to decode the data encoded in that message, three levels of correlation are carried out. Firstly individual packets are identified within the signal at step 30. These are then used collectively to ensure that the entire message is valid (making use of the expected spacing between packets in a valid message) at step 32. This is in turn used to find a packet peak at steps 34 and 36. Thereafter correlation is carried out at steps 38 and 40 on the individual bits within the packets to determine whether they are true or false. These steps 30-40 will be explained further below with reference to FIGS. 6 and 7.

Packet Correlation 30

Two packet templates 42, 44 are defined in order to identify packets within the signal. These are shown on the left-hand side of the vertical line in FIG. 6. The pattern of the templates is dictated by the communication scheme (i.e. the changes in median frequency between the four different bit positions), the acquisition parameters, the bit-length and the frequency spread specified. One template 42 corresponds to the frequency values for the true bits at each bit position; and the other template 44 corresponds to the frequency values for the false bits at each bit position. They are thus known as the true and false templates respectively.

Each template 42, 44 comprises pixels with a value of 1/(bit length*frequency spread). The sign of the pixel (i.e. whether they are above or below the median frequency for a given bit position) is determined by whether it is a true or false bit. The number of pixels along the time axis is given by quotient of the bit length and the STFT shift duration. The frequency spread can be specified by a user. It should be selected empirically to resemble the observed frequency spread of a direct path ultrasound message.

Along the frequency axis (y-axis) the templates are augmented by adding "f search width" zero's at both the lowest and highest frequency range. These acts as buffers for the frequency shift correlation to determine the Doppler shift.

The incoming STFT results 46 are matched against the two templates 42, 44 using a two-dimensional cross-correlation: both the templates are shifted along the frequency and time axes. For each time and frequency position the true and false templates will each generate a cross-correlation score. These scores are then added together to give a score for that frequency and time shift. The combination of frequency and time shift which gives the highest value for this summed score is denoted as the 'winning' cross-correlation.

A trace may be produced which is a plot of the correlation value as a function of time. This is achieved by calculating the packet correlation, spaced by "shift" samples, as described earlier. The peak in this trace represents the highest correlation of the incoming signal with the summed true and false bit templates 42, 44 at that time instant and for all allowed Doppler shifts. As the correlation process continues (it is carried out continuously), the next packet will be encountered and so another peak will be generated. Thus in the time in which a whole message has been received there will be seven peaks in the correlation trace in the presently described example.

An example of a correlation trace may be seen in FIG. 7a. Although the correlation scores for all 4 bits of each packet template 42, 44 are summed to produce the trace in FIG. 7a, the correlation scores of each bit position are also recorded. These are shown in FIGS. 7c to 7f with FIG. 7c corresponding to bit 1; FIG. 7d corresponding to bit 2, FIG. 7e corresponding to bit 3; and FIG. 7f corresponding to bit 4. In these plots the false bit template correlations are apportioned negative values. Thus for example in FIG. 7c bit 1 is true in the first 3 packets, false in the fourth, true in the fifth and false in the sixth and seventh packets. These plots allow direct estimates of the bit values but a more accurate and reliable method of determining these is set out below.

Bitwise noise correlation is performed by defining at each time step a noise level corresponding to the correlation value of the 'losing' bit value correlation.

The time-frequency correlation routine set out above generates the packet correlation as a function of time (FIG. 7a) that can then be in turn used for thresholding and peak detection to determine the location of packets. The routine also makes available the bitwise correlation and noise matrices and the packet Doppler index that are used by later routines to find the bitwise Doppler shift and winning bit sign.

The routine described above stores the correlation results in intermediate buffers that are at least long enough to hold STFT correlation results of one message with some buffering.

Amplitude re-scaling by correlation is optionally carried out in which the incoming signal is normalized over a predetermined time window to provide an amplitude normalization constant, the normalized signal is used in subsequent Fourier transform and cross-correlation calculations and the final results from the cross-correlation are corrected by multiplying them by the normalization constant. This has the advantage of avoiding having to process the Fourier transforms and cross-correlations using floating numbers. This is an important consideration for e.g. embedded systems where the use of floating numbers carries a high computational overhead.

Message Correlation 32

The known periodicity of the packets within a message can be exploited to carry out verification of the message and to obtain an accurate timing for the bits. Knowing that a message consists of n packets with a spacing in time of k time intervals, then for each time instant, the arithmetic or geometric mean is calculated over the last n samples spaced by k time intervals. In the example described herein, where a message comprises seven packets, a sample is taken from each of the seven packets, the samples being separated by the packet spacing. The arithmetic or geometric mean is then calculated to give a single, message level, correlation peak 48. This can be seen in FIG. 7b. Effectively the individual packet correlation peaks are each time-shifted by an amount dependent on their position in the message so that they are all collapsed onto the same time point and then the mean (arithmetic or geometric) is taken to produce the single peak. It has been found that for short packet lengths (e.g. 3 bits) an arithmetic mean works best, for larger packet lengths (e.g. 7 bits) a geometric mean works better.

As a result of the averaging, the process above always produces a clear peak 48 even if one of the packet correlation peaks is very low or missing. In fact the peak 48 has the shape of a sinc function-sin(x)/x as can be seen from FIG. 7b. The two sidebands of this function 50 are a predetermined proportion of the height of the main peak 48, and this ratio is highly invariant to other factors. This is therefore used for verification of the message. If the expected ratio is not present to within a predefined threshold, the potential message is discarded as noise.

At step 34 the message correlation as a function of time is analyzed for peaks and peaks are visualized in the packet/message correlation graph. Peak finding is performed using a built-in Labview routine. Peak finding is done using an internal data buffer ensuring that every time/data point in the message correlation is analyzed (thereby avoiding discontinuities on the STFT frame boundaries).

The highest peak that can be obtained by the message correlation routine is calculated and provides an accurate time instance for message arrival (since the offsets applied to the packets to produce it are accurately known). This timing information can then be used for packet peak finding at step 36 and for stage two of the decoding (steps 38 and 40) where the individual bits in each packet are determined to be true or false. The Applicant has appreciated that the routine set out above gives a very precise and accurate indication of the message arrival time since it effectively takes an average of all 28 bits that make up a message, Thus whilst the inherent timing error may be a relatively large proportion of the duration of individual bits (which is 20 ms in this example), the averaging over all bits dramatically reduces the proportionate error. Accurate and precise knowledge of the message arrival time is useful not only for decoding the message but also for giving time-of-flight information. This allows the distance to the mobile transmitter tag to be determined accurately, typically to within a few centimeters. This further enhances the possible applications to which such embodiments of the invention can usefully be put.

The routine described above stores the correlation results in intermediate buffers that are at least long enough to hold STFT correlation results of one message with some buffering.

Bit Determination

Once a new central message peak 48 has been identified at step 34, packet peaks are calculated at step 36, the bit correlations are analyzed find bit peaks at step 38 to identify the value of each bit at step 40. The routine takes the time (buffer) location of the central message peak identified 48 and analyses the content of the bit correlation difference and sum.

For each bit a calculation is made as to whether the maximum correlation is given by the positive or the negative correlation. The result of this is used to select the 'winning' Doppler index. The Doppler index is then stored as are the bit correlation with sign, bitwise noise correlation, packet correction and packet noise correlation.

As the 7 packets (in this example) are decoded the message can be assembled at step 52 and a cyclic redundancy check carried out on the decoded message.

In the example used above of a 28 bit message from the mobile ultrasound transmitter the message format can include an identification code, status information (e.g. battery level, whether it is stationary or moving) and an error check such as 7 bit cyclic redundancy check. This makes it suited to a variety of different applications such as asset tracking, security identity verification etc. An estimate of proximity could be determined by signal strength which may be sufficient to enact certain operations when a user is within a predetermined range of a computer.

The message decoding method set out herein gives a highly robust and accurate way of decoding data encoded on ultrasound tones, especially when these are detected by microphones and associated receiving means not designed for ultrasound reception. This makes the use of off-the-shelf audio receiving systems highly suitable for use in ultrasound communication applications.

As previously explained the coded data could for example be an identification code. In some preferred embodiments this could be arranged as part of a code-hopping protocol with similar algorithms being used at the transmitter and receiver to generate and verify the codes respectively. This makes the system even more secure since even if an eavesdropper were to be able to get sufficiently close to intercept a transmission from the tag, it would not be possible to use this to construct an imitating transmitter and therefore gain a false identification.

The Applicant has recognized that for the time being there will be a large number of computers in existence that do not have the ideal audio capabilities discussed above. However these can still benefit from the principles of the invention by the use of a frequency down-converter. One such embodiment will be described with reference to FIG. 8. In this Figure there can be seen an ultrasound-enabled microphone 60, the signal from which passes through a band-pass filter 62 to a mixer 64. The band-pass filter 62 passes ultrasound frequencies in the range 35-45 kHz to prevent aliasing between The second input to the mixer 64 is from a local oscillator 66. The output from the mixer 64 is passed to a jack plug for plugging into the microphone input socket of an ordinary PC sound card 68. Conveniently the microphone and other circuitry can be powered from the voltage supplied by the microphone input of the standard PC sound card 68. The effect of mixing the signal received from the microphone 60 with that from the local oscillator 66 is effectively to subtract the respective frequencies (multiplication on the time domain being equivalent to addition/subtraction in the frequency domain). The incoming signal is thereby effectively down-converted in frequency by a fixed amount. The band-pass filter before the mixer helps to prevent aliasing of the down-converted signal with audible signals in the same frequency range.

The microphone could, for example, be a Panasonic wm-61 condenser microphone. These microphones contain a field-effect transistor (FET) within their package which in normal use is designed to have a fixed bias voltage of approximately 1 volt applied to it. However by applying the oscillating signal from the local oscillator 66 to the bias input of the FET, it acts as the mixer 64. In an alternative configuration a resonant Murata Piezotite® piezo-electric transducer could be used in place of the microphone 60. This would obviate the need to provide a separate band-pass filter 62 since these have a narrowband characteristic by their nature. An example of a suitable transducer is the MA40S4S or the MA40B8R/S from Murata Manufacturing Co., Ltd, Kyoto, Japan. If such a transducer is used a separate FET or other mixer is required.

To give a specific example if a mixing frequency of 32.67 kHz is provided by the local oscillator, then this will down-convert ultrasound signals in the range 35-45 kHz down to the band 2.33-12.33 kHz. This signal is then passed to the sound card which has a sample rate of 44.1 kHz at 16 bits. This is easily sufficient to digitize the down-converted signal and allow it to be processed in exactly the same way as is in the embodiments described above.

Figure 8:
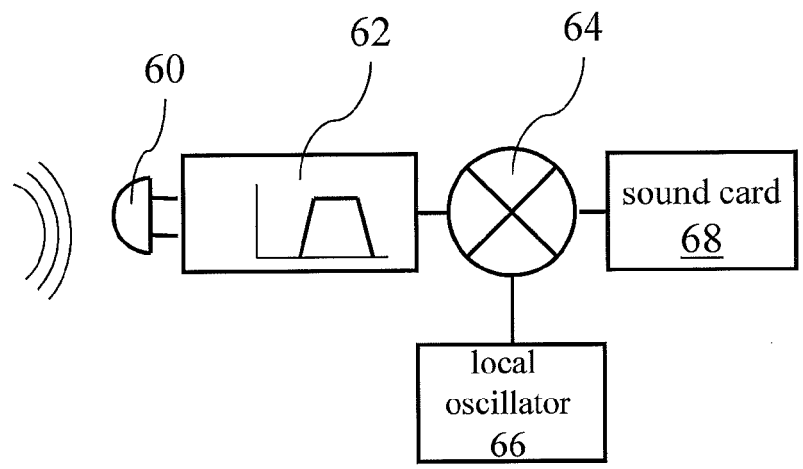
FIG. 8 is a schematic diagram of the external receiving module of further embodiment of the invention.
Figure 9:
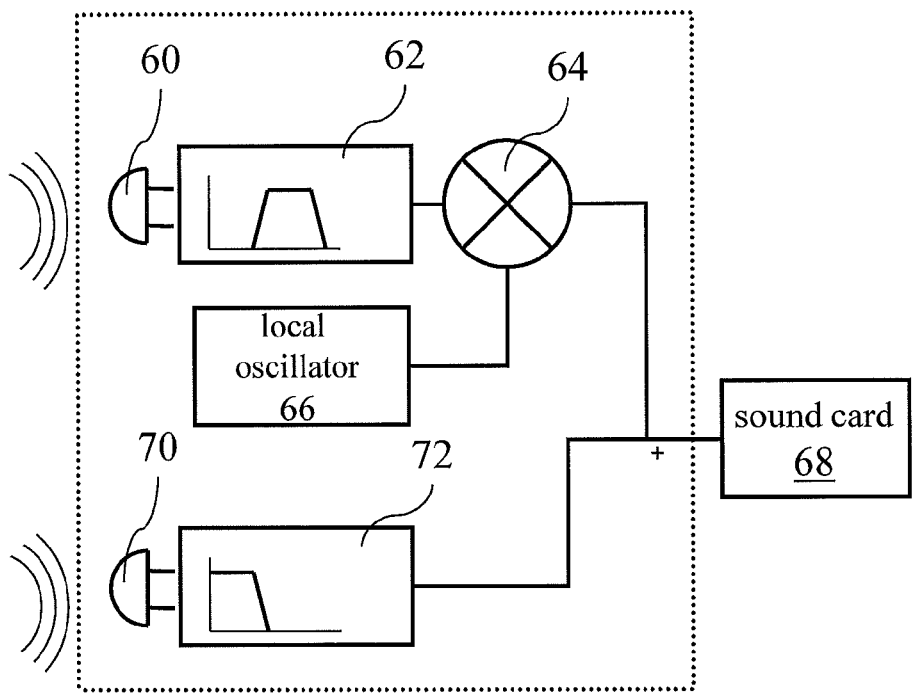
FIG. 9 is a schematic diagram of an external receiving module similar to that in FIG. 8 but also able to receive speech.

FIG. 9 shows a modification to the FIG. 8 embodiment. This embodiment allows the microphone input on the sound card 68 to be used for ordinary speech as well as for processing down-converted ultrasound signals as described with reference to the FIG. 8 embodiment above. Accordingly a second microphone 70 is provided to pick up speech which is passed through a low-pass filter 72 and directly into the sound card 68. The low-pass filter 72 has a roll-off at approximately 8 kHz. This ensures that ordinary speech frequencies (100-6000 Hz) are passed whilst blocking higher frequency sounds. On the other hand, by setting the frequency of the local oscillator 66 in this embodiment to 25 kHz, the ultrasound signals in the range 35-45 kHz will be down-converted so as to occupy the range 10-20 kHz. This ensures that the speech and ultrasound signals remain clearly distinct from one another in frequency and so can be easily separated after digitization.

Although not explicitly described, the system could also receive and analyze voice for characteristic frequencies and patterns that enable a user carrying a tag to be independently identified in order to act as a further level of security.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method of receiving data coded on an ultrasonic signal comprising:
   detecting said ultrasonic signal using a microphone having its greatest response below 20 kilohertz;
   down-converting the frequency of said ultrasonic signal by applying oscillatory control to an amplifier amplifying signals received by the microphone to modulate the ultrasonic signal at a predetermined frequency; and
   decoding said signal to determine said data.

2. A method as claimed in claim 1 further comprising comparing the detected signal to one or more predetermined templates.

3. A method as claimed in claim 2 wherein said detected signal comprises a plurality of distinct packets and said comparison procedure comprises a first stage in which a received message is compared on a packet basis to a packet template and a second stage in which individual bits within the packet are determined.

4. Apparatus for receiving an ultrasonic signal comprising a microphone having its greatest response below 20 kilohertz;
   an amplifier for amplifying signals received by the microphone;
   a frequency down-converter that down-converts the frequency of said ultrasonic signal by applying oscillatory control to the amplifier so as to modulate the ultrasonic signal at a predetermined frequency; and
   a decoder that decodes said ultrasonic signal received by said microphone.

5. Apparatus as claimed in claim 4 wherein the maximum response of the microphone is below 35 kilohertz or below 30 kilohertz.

6. Apparatus as claimed in claim 4 arranged to receive ultrasound on a dedicated sound channel.

7. Apparatus as claimed in claim 4 wherein the microphone is connected to or integral with a computing device having dynamic bandwidth assignment.

8. Apparatus as claimed in claim 7 wherein said computing device has support for multiple streams.

9. Apparatus as claimed in claim 4 comprising only a single microphone or pair of microphones.

10. Apparatus as claimed in claim 4 wherein the frequency down-converter applies oscillatory control to the gain of the amplifier.

11. Apparatus as claimed in claim 4 wherein the frequency down-converter applies oscillatory control to a supply voltage to the microphone.

12. Apparatus as claimed in claim 4 comprising a computer sound card that samples the down-converted signal at a sample rate of 44.1 kHz at 16 bits.

13. A method as claimed in claim 1 comprising applying oscillatory control to the gain of the amplifier.

14. A method as claimed in claim 1 comprising applying oscillatory control to a supply voltage to the microphone.

15. A method as claimed in claim 1 comprising sampling the down-converted signal at a sample rate of 44.1 kHz at 16 bits.

16. A method as claimed in claim 1 wherein the ultrasonic signal is in the range 35-45 kHz.

* * * * *